2,705,246
Patented Mar. 29, 1955

2,705,246
SEPARATION OF ORGANIC NITROGEN COMPOUNDS

Ernst Knust, Leverkusen-Bayerwerk, Germany, assignor to Farbenfabriken Bayer Aktiengesellschaft, Leverkusen, Germany, a corporation of Germany No Drawing. Application March 9, 1951,
Serial No. 214,845

Claims priority, application Germany March 9, 1950

5 Claims. (Cl. 260—583)

This invention relates to a process of separating organic nitrogen compounds.

According to the prior art processes separation of mixtures containing methylamines or mixtures containing methylamines and ammonia as are obtained in the methylation of ammonia is mostly accomplished by fractional distillation. However, isolation of the components contained in the above said mixtures encounters difficulties due to the formation of azeotropic mixtures of the trimethylamine with the other methylamines or with ammonia occurring during fractional distillation. The difficulties can be eliminated by carrying out the fractional distillation under pressure or by separating the azeotropic mixtures by treatment with water or aqueous solutions of salts or alkalies, however, this process is complicated and requires special apparatus.

According to the present invention separation of organic nitrogen compounds comprising mono-, di-, and trimethylamine and ammonia may be accomplished without distillation by treating said mixtures with weak acids whose adducts with the above mentioned nitrogen compounds decompose at a temperature below the boiling point of the weak acids and expelling the amines absorbed from said weak acids. Ammonia or the trimethylamine may be separated from the above said mixtures of nitrogen compounds at any state of the process by treatment with higher boiling neutral organic solvents as defined, for instance, in British specifications No. 631,672, No. 631,673, or with water wherein alkali hydroxide or inorganic or organic salts may be dissolved.

The application of the new process is of special importance for the separation of the reaction mixture obtained in the methylation of ammonia, said reaction mixture principally consisting of ammonia, mono-, di-, and trimethylamine. It is of advantage to remove water and methanol contained in the reaction mixture prior to the separation.

The process according to the present invention is based on the fact that the stability of the adducts of said organic nitrogen compounds with said weak acids varies depending on the basicity. The basicity figures of ammonia and of the methylamines, defined by their dissociation constants in aqueous solutions at 25° C., are

| | |
|---|---|
| $NH_3$ | 0.000023 |
| $(CH_3)_3N$ | 0.000074 |
| $CH_3NH_2$ | 0.00050 |
| $(CH_3)_2NH$ | 0.00074 |

By treating mixtures containing two, three or four members of the group of said nitrogen compounds with the above-defined weak acids the stronger base is absorbed to a larger extent, whereas the weaker base is expelled by an excess of the stronger base. From a mixture containing ammonia and mono-, di-, and trimethylamine, for instance the methylamines are absorbed with said weak acids provided that the velocity of flow of the mixture of the nitrogen compounds and the amount of the weak acids are appropriately controlled. The ammonia is strongly enriched in the escaping gaseous phase and may be isolated in absolutely pure form by repeating the acid treatment once or several times. In the same manner the trimethylamine or the monomethylamine can be separated from the dimethylamine contained in the mixture of the methylamines and may be isolated in a pure form. Thus, the present invention offers the possibility of isolating, in a most simple manner, from the mixtures containing methylamines and ammonia with 2–4 components each of these components in pure form. By appropriate modification of the velocity of flow of the mixture of nitrogen compounds or by adjusting the amount of the weak acids applied the process of the invention may be varied so that one or two components only are absorbed.

The amount of acid to be employed according to the invention may be determined in accordance with the following principles:

(a) As already mentioned above, the strongest base is absorbed to a larger extent.

(b) The quantity of the nitrogen compound absorbed at room temperature and normal pressure amounts to about 0.8 mol per 1 mol of the weak acid.

(c) Said quantity varies depending on the pressure and the temperature applied.

By appropriately controlling the quantities of the weak acids with respect to the quantities of the single components of the mixture, one, two or three components are absorbed.

The present separation process is based on the principle of enriching one or more components due to the distribution equilibria occurring. Therefore, the process of the present invention may be carried out under similar conditions as are applied in other separation processes, for instance, in the extractive distillation. By repeating the process once or several times which corresponds to the application of the counter-current principle, each of the components or certain desired components only are obtained in pure form from the starting mixture.

The absorbing power of the weak acids is reduced with rising temperature. It is therefore preferable to operate at room temperature or at only slightly elevated temperature. Increase of pressure involves an increase of the absorptive power of the weak acids as to the amines. It is assumed that the nitrogen compounds absorbed form salt like compounds with the weak acids. Of course, it is also possible according to the present invention to separate the nitrogen compounds of one mixture by applying different weak acids in the single steps. After expelling the nitrogen compounds the weak acids may be returned to the process whereby it is not absolutely necessary to completely remove the amines. Expelling of the nitrogen compounds may be accomplished by heating the weak acids containing the nitrogen compounds absorbed to a temperature below the boiling point of the weak acids applied or by reducing the pressure by evacuation. In case the mixture of nitrogen compounds has been contacted with the weak acids under pressure the nitrogen compounds may be expelled by subsequently reducing the pressure and, if desired, heating the mixture.

The process according to the present invention may also be accomplished in such a manner that the mixture of the nitrogen compounds is completely dissolved in an excess of the above-defined weak acids and the weakest base is expelled by contacting the solution with one of the more strongly basic nitrogen compounds.

Suitable weak acids according to the invention are those, whose ammonia or methylamine addition products decompose into the individual components at temperatures below the boiling point of said acids. The term weak acids as used in this specification is intended to include compounds which exhibit weak acid reactions although they are not strictly speaking weak acids.

The following weak acids or acid reacting compounds may be employed with this invention: mono- or polyvalent mono- or polynuclear aromatic hydroxy compounds, such as phenol, alkylphenols, for instance cresols, xylenols, arylphenols, resorcin, naphthols, chlorophenols, and aminophenols.

A special embodiment of the invention consists in removing, prior to or after treatment of the reaction mixture with weak acids, trimethylamine or ammonia, respectively, by extraction with water, aqueous alkalies, aqueous solutions of inorganic or organic salts or with higher boiling organic solvents in known manner, for instance, as described in U. S. Letters Patent 2,119,474 and British specification 475,818.

The purpose of adding alkalies or salts to the water is to reduce the solubility of the nitrogen compounds in water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

The dissolved mixture of methylamines is expelled from the cresol mixture by heating to 180° C. and, as indicated in Example 6, separated by selectively dissolving the dimethylamine in a mixture of phenol and o-dichlorobenzene.

Example 8

A gaseous mixture of nitrogen compounds consisting of about equal parts by volume of ammonia, mono-, di-, and trimethylamine is contacted in an absorption tower packed with Raschig rings and having a diameter of 25 mm. and a height of 2.50 m., with 24 grams per hour of a mixture of phenol and o-dichlorobenzene, the velocity of the gas mixture amounting to 40 liters per hour. Ammonia escapes at the top of the reaction tower in practically pure form, the methylamines being dissolved.

The solution discharged at the bottom of the reaction tower flows through an evaporator heated to 170° C. whereby the methylamines absorbed are expelled from the solution. The gas mixture of the methylamines is contacted in counter-current in an absorption tower of the same dimensions as described above with a 17% caustic soda solution at temperatures from 35 to 40° C. 600 cm.$^3$ of caustic soda solution are charged per 100 liters each of the gas mixture. A 99% trimethyl amine not absorbed is taken off from the top of the tower whereas a solution containing besides the other methylamines 0.5–1% of trimethylamine is discharged at the bottom of the tower.

In the separation of the mixture expelled from the sump according to Example 6 a 100% dimethylamine is obtained whereas the remaining trimethylamine is obtained together with the monomethylamine.

Example 9

Trimethylamine is separated from a mixture consisting of about equal parts by volume of ammonia, mono-, di-, and trimethylamine as indicated in Example 7. In a reaction tower of 2.50 m. length and 25 mm. diameter packed with Raschig rings the mixture of ammonia, mono- and dimethylamine expelled from the sump is contacted in counter-current with acetonitrile, 9 liters of the gas mixture being fed to 100 g. each of acetonitrile. The gas mixture escaping at the top of the tower consists of 71.5% by volume of ammonia and of 28.5% by volume of monomethylamine and is free from dimethylamine whereas the mixture of nitrogen compounds dissolved in acetonitrile consists of 37 mol per cent of monomethylamine and 63 mol per cent of dimethylamine and is practically free from ammonia. The mixture of mono- and dimethylamine is separated by contacting it with a mixture of phenol and o-dichlorobenzene by fractional absorption as described in Example 6.

The mixture of ammonia and monomethylamine obtained in the treatment with acetonitrile is contacted in an absorption tower as described above in counter-current with a mixture of equal parts by weight of crude cresol and nitrobenzene. 25 liters of the gas mixture and 64 g. of the solvent mixture are charged per hour.

Pure ammonia escapes at the top of the tower, monomethyl amine containing 3% ammonia is expelled by heating to 180° C. from the solution taken off from the bottom of the tower.

Example 10

In an absorption tower of 2.50 m. height and 25 mm. diameter packed with Raschig rings a gas mixture consisting of 47.5% by volume of ammonia, 19.5% by volume of monomethylamine, 7.5% by volume of dimethylamine and 25.5% by volume of trimethylamine is countercurrently contacted with a 17% caustic soda solution at a temperature between 35 and 40° C. 500 cm.$^3$ of caustic soda solution are employed per 100 liters each of the gas mixture.

A gas mixture consisting of 18.7% by volume of monomethylamine, 19.8% by volume of dimethylamine and 61.5% by volume of trimethylamine and being free from ammonia escapes at the top of the tower.

The mixture dissolved in the caustic soda solution is free from trimethylamine and consists of 70% by volume of ammonia, 27.4% by volume of monomethylamine and 2.6% by volume of dimethylamine. This mixture is not further worked up but is returned to the methylation process.

The mixture of the nitrogen compounds not absorbed by the caustic soda solution is contacted in a second step with a 15% caustic soda solution in such quantitative proportions that the mono- and dimethylamine present in the mixture are selectively dissolved whereby the trimethylamine is separated.

The mono- and dimethylamine are separated by means of a mixture of phenol and o-dichlorobenzene as described in Example 6.

The separation of the part of the gas mixture that was not absorbed by the caustic soda solution in the first step may also be accomplished by drying the methylamines and treating them in an absorption tower of the same dimensions as indicated above with a technical phenol-cresol mixture. 40 liters of the gas mixture and 100 g. of the solvent are charged per hour. A 96% trimethylamine escapes at the top of the tower. The absorbed mixture of mono- and dimethylamine is free from trimethylamine and is treated with a mixture of phenol and o-dichlorobenzene as described in Example 6. Both amines thus separated are obtained in a purity of more than 98%.

Example 11

A gas mixture consisting of equal parts by volume of mono-, di-, and trimethylamine is contacted in a 1 m. high reaction tower packed with Raschig rings with anhydrous cresol, 70 liters of the gas mixture and 400 cm.$^3$ of cresol being charged per hour. The non-absorbed gas mixture consists of 93% by volume of trimethylamine and 7% by volume of mono- and dimethylamine whereas the part of the mixture dissolved in the cresol consists of 89% by volume of mono- and dimethylamine and of 11% by volume of trimethylamine. When operating in a reaction tower of 2 m. height under otherwise equal conditions the non-absorbed gas mixture obtained consists of 97% by volume of trimethylamine and 3% by volume of mono- and dimethylamine. The dissolved part of the mixture consists of 94% by volume of mono- and dimethylamine and 6% by volume of trimethylamine.

If cresol saturated with water is used as absorbent for mono- and dimethylamine, an excellent separating effect is achieved even when operating with a reaction tower of 1 m. height, i. e. the non-absorbed trimethylamine contains only 0.5% by volume of mono- and dimethylamine whereas the dissolved part of the mixture practically consists of 100% of mono- and dimethylamine.

I claim:
1. The process of separation a mixture of nitrogen compounds of the group consisting of mono-, di-, and trimethylamine and ammonia which includes the steps of contacting said mixture with a member selected from the group consisting of phenols and napthols, whereby at least one of said nitrogen compounds is absorbed by said group member, separating the unabsorbed fraction and thereafter expelling the absorbed nitrogen compounds.

2. Process in accordance with claim 1, in which said absorbed nitrogen compounds are expelled by heating to a temperature below the boiling point of said member of the group consisting of phenols and napthols.

3. Process in accordance with claim 1, in which said absorbed nitrogen compounds are expelled by introducing a nitrogen compound, the basicity of which is higher than that of the absorbed nitrogen compound.

4. Process in accordance with claim 1, in which said member selected from the group consisting of phenols and naphthols is contacted with said mixture of nitrogen compounds in the presence of a neutral organic solvent boiling above 100° C. and inert to said group member and to the nitrogen compounds being separated.

5. Process in accordance with claim 1, including the additional step of contacting said mixture with a solvent selected from the group consisting of water; aqueous alkali hydroxide solutions; salt solutions inert to nitrogen compounds; and neutral organic solvents boiling above 100° C. and inert to said group member and to the nitrogen compounds being separated.

References Cited in the file of this patent

UNITED STATES PATENTS

| | | |
|---|---|---|
| 2,119,474 | Spence | May 31, 1938 |

FOREIGN PATENTS

| | | |
|---|---|---|
| 435,200 | Great Britain | Sept. 17, 1935 |
| 436,224 | Great Britain | Oct. 4, 1935 |
| 486,822 | Great Britain | June 10, 1938 |